United States Patent [19]
Cowperthwaite et al.

[11] Patent Number: 5,763,503
[45] Date of Patent: Jun. 9, 1998

[54] RADIATION-CURABLE, MOLDABLE MATERIAL, METHODS FOR CURING IT AND MOLDED ARTICLES OBTAINED THEREFROM

[75] Inventors: George F. Cowperthwaite, Coatsville; Gary R. Shaw, Norristown, both of Pa.; Susan C. Sheariss, Swedesboro, N.J.

[73] Assignee: Esschem, Inc., Linwood, Pa.

[21] Appl. No.: 642,624

[22] Filed: May 3, 1996

Related U.S. Application Data

[63] Continuation-in-part of Ser. No. 478,818, Jun. 7, 1995, abandoned.

[51] Int. Cl.$^6$ .................................. C08F 2/50; C08L 75/16
[52] U.S. Cl. ............................. 522/44; 522/81; 522/96; 522/173; 522/182; 264/22
[58] Field of Search .................... 522/44, 175, 96, 522/173, 182; 264/22

[56] References Cited

U.S. PATENT DOCUMENTS

| | | | |
|---|---|---|---|
| 4,618,632 | 10/1986 | Su | 522/43 |
| 4,814,119 | 3/1989 | Scholz | 264/22 |
| 4,816,495 | 3/1989 | Blackwell et al. | 522/14 |
| 4,902,724 | 2/1990 | Moore | 522/40 |
| 4,929,403 | 5/1990 | Audsley | 264/22 |
| 5,118,779 | 6/1992 | Szycher | 528/70 |
| 5,128,235 | 7/1992 | Vassiliou et al. | 430/322 |
| 5,166,186 | 11/1992 | Kojime et al. | 522/37 |
| 5,247,048 | 9/1993 | Meixner et al. | 528/49 |
| 5,248,752 | 9/1993 | Argyropoulos et al. | 528/49 |
| 5,260,361 | 11/1993 | Fukushima et al. | 524/98 |
| 5,290,663 | 3/1994 | Huynh-Tran | 430/284 |
| 5,300,615 | 4/1994 | Meixner et al. | 528/49 |
| 5,322,861 | 6/1994 | Tsuge et al. | 522/90 |
| 5,328,805 | 7/1994 | Huynh-Tran et al. | 430/284 |

*Primary Examiner*—Susan W. Berman
*Attorney, Agent, or Firm*—Connolly & Hutz

[57] ABSTRACT

The disclosed method for making hollow shells (e.g. housing for in-ear hearing aids) employs a radiation-curable polymer comprising (a) a major amount of urethane methacrylate monomer (molecular weight 360–950) having a viscosity less than about 15,000 cps at 25° C., (b) a viscosity-adjusting minor amount of unreacted hydroxyalkyl-methacrylate monomer, (c) a photoinitiating amount of a photoinitiator of the formula $Ar^1$—CO—C(OR)$_2$—R', where $Ar^1$ is aryl (e.g. phenyl), R is $C_1$-$C_4$-alkyl (e.g. methyl), and R' is hydrogen or alkyl or, preferably, aryl, and, optionally, (d) a coloring agent, e.g. a pigment concentrate. Viscosity control is of major importance; so the curable composition is generally solvent-free and free of viscosity-modifying solids (other than coloring agents). Acrylates (as distinct from methacrylates) are also omitted. The fully-formulated, curable composition is easily pourable and has a viscosity of less than about 2,000 cps. The hollow shells are made by:

A. pouring the curable composition into the mold cavity of a translucent mold,
B. exposing all but the top surface of the mold to 200–450 nm light (e.g. UV light of 200 to 350 nm), until a solid layer<3 mm in thickness has formed, and
C. pouring out the uncured material. The thin, solid layer is then preferably subjected to a second radiation cure until the layer is toughened by cross-linking.

13 Claims, No Drawings

RADIATION-CURABLE, MOLDABLE MATERIAL, METHODS FOR CURING IT AND MOLDED ARTICLES OBTAINED THEREFROM

CROSS REFERENCE TO RELATED APPLICATION

This application is a continuation-in-part of our application Ser. No. 08/478,818, filed Jun. 7, 1995, now abandoned.

FIELD OF THE INVENTION

This invention relates to the use of a pourable, liquid composition of matter which is polymerized or cured by wave energy (e.g. light energy in the ultraviolet or visible portion of the electromagnetic spectrum) and which contains a cure rate-affecting material such as a photoinitiator, wherein the resulting polymerization reaction converts at least a portion of the pourable liquid material to a solid polymer. The invention also relates to the resulting cured articles. An aspect of this invention relates to a self-supporting solid hollow shell made by the process of this invention, wherein the wall of the shell can be relatively thin (e.g. from 0.25 to 3 mm in thickness). Another aspect of this invention relates to particularly preferred one-part pigmented liquid compositions of matter which are polymerized or cured by wave energy to form a self-supporting, relatively thin-walled, flesh-colored hollow shell, which shell can be used, for example, to house an in-ear hearing aid.

DESCRIPTION OF THE PRIOR ART

It has long been known that mono- and polyfunctional acrylate and methacrylate monomers, pre-polymers, and oligomers can be "cured" (polymerized, i.e. chain-extended and/or cross-linked) with readily available forms of electromagnetic wave energy or radiation such as light, e.g. visible or ultraviolet light having a wavelength in the range from about 200 to about 450 nanometers (nm). In some types of application of this technology, a coating of the acrylate or methacrylate-containing material can simply be exposed to sunlight or interior lighting, and an adequate cure will be obtained, but when a greater cure rate or greater quality control over the cured product is needed, a so-called "light box" containing a source of ultraviolet and/or visible light can be employed to concentrate or direct the wave energy on the curable material and/or to ensure that a particularly effective wavelength or wavelengths of light will irradiate the curable material.

According to a common practice in this art, the curable composition can contain a curable prepolymer or oligomer having at least one unsaturated site which is a derivative of acrylic or alkylacrylic acid, and, if desired, (b) a monofunctional or polyfunctional monomer derived from acrylic or methacrylic acid. The polymerizable (chain-extendable or cross-linkable) sites of such curable materials can be described by the structural formula

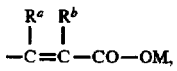

where $R^a$ and $R^b$ are hydrogen or alkyl, and —CO—OM is a carboxylic acid salt group or a carboxylic acid ester group.

The curing or polymerization taking place at these curable sites can be initiated very effectively and rapidly with the aid of a so-called photoinitiator, which is a compound typically containing at least one aromatic ring or aliphatic group and one or more oxygen-containing groups attached to a side chain (or some other non-ring position). Keto, hydroxy, and alkoxy groups are typical examples of such oxygen-containing groups.

When coatings or molded articles or encased electronic components or the like are desired, it is ordinarily desirable that the curable composition have the rheology of a moldable, coatable, or pourable liquid, even if it be a mixture of liquid and solid materials. The desired rheology (e.g. viscosity) can be provided by any one of a wide variety of strategies, including the use of two-part formulations, the formation of a latex, or the addition, to a liquid solution or suspension, of thickening agents or thixotropes, reactive diluents, inert organic diluents, reactive solids, inert solids such as fillers, and the like. In addition, a considerable effect upon viscosity and other rheological properties can result by selection or modification of the molecular weight range or other characteristics of the curable prepolymer or oligomer.

Typically, the curable oligomer or prepolymer is a polyester or a polyether or a polyurethane, "poly" being understood in this context to mean several ester or ether or urethane groups. Combinations of these recurring groups are also employed.

If, as in the case of curable ink compositions, the curable composition needs to be colored or opaque, a colorant such as pigment can be added to the composition. Pigments can, of course, absorb light energy; so adjustments in the formulation of the composition are sometimes needed to insure that the cure rate will be adequate.

Acrylic- and methacrylic-type polymers have been suggested for a wide variety of applications involving some degree of biocompatibility. Perhaps the most well-known of such applications is in the soft contact lens field. Typically, soft contact lenses comprise polymerized 2-hydroxyethylmethacrylate ("HEMA"), which ordinarily does not irritate the human cornea. Many compositions having utility in the field of dentistry (prostheses, adhesives, fillings, liners, etc.) comprise acrylate- or methacrylate-type materials. Drug-delivery systems employing acrylic-type adhesives can be in direct contact with human skin. So-called in-ear hearing aids typically employ acrylate- or methacrylate-type plastics as the shell or housing for the audio amplification system and the power supply for that system. In any of these applications, hypoallergenicity and low or negligible toxicity are normally required.

The shell for an in-ear hearing aid must be made to exacting specifications. Although some of these shells are formulated from compositions containing essentially arbitrarily-chosen colorants, such as red or blue pigments, if a flesh tone is desired, even the pigments used to color the shell should meet very exacting standards, which standards are set in order to comply with medical device regulations and provide a good match with the wide variety of colors of human skin, ranging from dark brown to the light pink or orange of caucasian flesh color.

Other demands imposed upon the hearing aid shell manufacturer include the wall thickness of the shell (which should be thick enough to provide a degree of rigidity but not so thick as to waste raw material and reduce the amount of space available for electronic components or the like) and various physical properties of the shell which reflect the desired toughness and rigidity and lack of brittleness. Residual monomer content should be as low as possible, and the plastic shell should as low in toxicity and allergenicity as reasonably possible.

The properties of the curable composition used to make the hearing aid shell are also important. The curable composition should also be low in toxicity and allergenicity and preferably also low in odor and volatiles. The composition should be easily pourable and should be easily and rapidly curable using a variety of wavelengths within the portion of the electromagnetic spectrum ranging from 200 to 450 nm, so that the manufacturer can use any of a variety of light boxes presently available in the marketplace. For efficient manufacturing, the cure rate should be rapid enough to provide a solid layer >0.1 mm, preferably at least 0.25 mm, or even 0.5 mm thick within minutes, preferably within seconds. However, the cure rate can also be too rapid, in which case the thickness of the cured shell can vary significantly. The uncured material which is still present after this rapid cure should remain easily pourable, so that it can easily be poured out of the layer-like, partially cured mass and re-used in a subsequent shell-forming operation, if desired.

SUMMARY OF THE INVENTION

It has now been discovered that an especially advantageous pourable, liquid, radiation-curable, methacrylate-capped urethane monomer/reactive diluent composition can be provided by selecting the ingredients of the composition for extreme simplicity of formulation and inherently good viscosity control. To achieve the objectives of this invention, the methacrylate-capped urethane monomer, the reactive components from which it is synthesized, and any reactive diluent used to adjust viscosity are selected for low or negligible toxicity and allergenicity and low odor. Thus, non-reactive diluents are generally avoided, but in addition, the presence of viscosity-affecting ingredients (even pigments) is carefully limited. For example, the reactive diluent is present in only a minor amount, the urethane methacrylate monomer having been pre-reacted and having been selected to have, inherently, very close to the desired viscosity. Accordingly, the molecular weight of the uncured urethane methacrylate monomer is kept within the range of about 360 to about 950. The photoinitiator is selected for an especially strong initiating effect within the desired portion of the electromagnetic spectrum (200–450 nm).

The method of this invention relates to the formation of a hollow article and, in accordance with known techniques of hollow article formation (see, for example, U.S. Pat. No. 4,814,119 to Scholz, issued Mar. 21, 1989), involves a plurality of curing steps. Thus, according to the method of this invention, A. a pourable liquid radiation-curable composition is poured into the mold cavity of a light-penetrable mold, the mold cavity having an exposed, generally upward-facing surface, until the composition covers a major amount of said generally upward-facing surface and until the major amount of said generally upward-facing surface defines a volume of curable composition equal to a major amount of the volume of the cavity, B. all but the top surface of the above-defined volume of the curable composition is exposed to electromagnetic radiation having a wavelength in the range of 200 to 450 nm, until a generally solid, polymeric layer (ranging in thickness from >0.1, preferably 0.25 to 3 mm in thickness) has formed within that volume of curable composition in closely-spaced relation to the covered portion of the generally upward-facing surface, so that the uncured part (non-solid remainder) of the curable composition will still be a pourable liquid material, and C. the uncured, pourable part of the curable composition is poured from the mold cavity.

The polymeric layer which is formed initially according to step "B", above, does not have to be fully cured through its entire thickness and does not need to have a high cross-link density. Indeed, this polymeric layer does not even have to be self-supporting initially, since it can remain in place in the mold cavity and be subjected to a second curing step, if desired, in a manner known in this art. In the second curing step, a translucent organic liquid is preferably poured into the mold cavity to cover the partially-cured polymeric layer, and light energy in the 200–450 nm portion of the spectrum is applied to the entire polymeric layer, including top, sides, and bottom. After this second curing step, the translucent organic liquid can be poured out, and the tough, rigid (but not brittle) self-supporting shell can be rinsed on the inside (and the outside as well, if desired) with an organic liquid, preferably a good solvent for the translucent organic liquid which was present during the second curing step.

The pourable liquid radiation-curable composition used in this method comprises:

a major amount of a hydroxyalkylmethacrylate-capped, essentially difunctional;, urethane methacrylate monomer having a molecular weight in the range of about 360 to about 950 and a viscosity less than about 12,000 centipoise at 25° C. and having the structural formula I

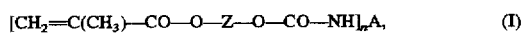

where

A is an essentially divalent aliphatic or cycloaliphatic group (that is, any amount of trivalent or higher valence A groups which could significantly raise the viscosity of the curable composition is excluded), Z is $C_2$-$C_3$-alkylene, and n is a number ranging from 1.75 to 2.25;

a viscosity-adjusting minor amount of unreacted hydroxy ($C_2$-$C_3$-alkyl)methacrylate monomer, and a photoinitiating amount, not exceeding about 5% by weight, of a photoinitiator of the formula II

where $Ar^1$ is a monocyclic aromatic group,

R is a $C_1$-$C_4$-alkyl group, and

R' is hydrogen or alkyl or a monocyclic aromatic group; said radiation-curable composition being essentially free of:

a recoverable amount of liquid organic solvent which is inert toward radiation curing; a viscosity-increasing amount of a viscosity-increasing solid, other than a colorant or filler; and compounds having at least one α-carbon-unsubstituted acrylate group.

The curable composition is carefully formulated to contain sufficient hydroxyalkyl-methacrylate to have a relatively low viscosity. The Brookfield viscosity of the fully formulated composition at 20° C. should not exceed about 5,000 cps and can be as low as about 600 to 2000 cps, even if the difunctional urethane methyacrylate monomer has a viscosity of 15,000 cps.

It is particularly preferred that the composition described above be pigmented (but in a manner that has no significant effect upon the viscosity of the composition) and that the reactive solvent (viscosity-reducer) and hydroxyalkyl-methacrylate used to form the capping group of the urethane methacryate monomer be 2-hydroxyethylmethacrylate (HEMA). Hydroxypropylmethacrylate is also suitable for this purpose; however, acrylates and polyacrylates (α-carbon-unsubstituted acrylates) should be essentially excluded, since they do not reliably satisfy the hypoallergenicity and low toxicity criteria of this invention.

The preferred use of the method of this invention is in the manufacture of a self-supporting solid hollow shells, particularly shells pigmented so as to match fairly closely any of a variety of human skin colors, which shells are ideally suited for use as a shell or housing for hearing aid components, e.g. an audio amplification system and a power supply, which typically includes a small battery.

DETAILED DESCRIPTION

As used in this specification, the prefix "poly-" is intended to refer to a plurality of repeating units or functional groups. Thus, the term "polyacrylate" is intended to denote a diacrylate, triacrylate, etc.

The term "acrylate" is specifically intended to refer to derivatives (e.g. esters or salts) of acrylic acid, $H_2C=CHCOOH$, and therefore denotes compounds which are unsubstituted (have a hydrogen atom) in the α-position with respect to the carboxylic or carboxylate group (—CO—O—), whereas "alkylacrylate" or "methacrylate" is intended to refer to compounds having an alkyl group (usually methyl or ethyl) in that α-position. This distinction is important in the context of this invention, because some of acrylates (mono- or polyacrylates) are, as a general rule, more allergenic or more toxic than the corresponding methacrylates.

Among the least toxic and least allergenic methacrylates are HEMA (2-hydroxyethylmethacrylate) and its next higher homologs, the hydroxypropylmethacrylates (2- and/or 3-hydroxypropylmethacrylate, sometimes abbreviated HPMA). Accordingly, a determined effort has been made in this invention to formulate the pourable liquid, radiation-curable composition around HEMA and/or HPMA and HEMA- and/or HPMA-capped urethane monomers, not only so that the resulting solid polymer will be as biocompatible as possible, but also so that any residual monomer present in that polymer will be biocompatible also. In the context of this invention, HEMA and HPMA are also preferable in terms of commercial availability, even with respect to other hydroxy(lower alkyl)methacrylates such as 4-hydroxybutylmethacrylate. Of the two preferred hydroxyalkylmethacrylates, HEMA is especially preferred.

The following is a detailed description of the various components of a pourable liquid radiation-curable composition of this invention.

THE URETHANE METHACRYLATE

The desirable physical properties of a cured article of this invention can be attributed primarily to the hydroxyalkylmethacrylate-capped, essentially difunctional, urethane methacrylate monomer. This monomer, which has essentially two polymerizable methacrylate groups, can be made in a well known manner by reacting a suitable aliphatic or cycloaliphatic diisocyanate with HEMA or HPMA in an OH/NCO ratio which will provide capping of the diisocyanate but not chain extension. Suitable OH/NCO ratios can range from 1.75 to 2.25, but the use of at least about 2.0 moles hydroxyalkylmethacrylate per mole of diisocyanate (e.g. a slight excess over 2.0) is preferred to insure that the molecular weight of the resulting urethane dimethacrylate will not exceed about 950, thereby providing inherently good viscosity control. Moreover, excess hydroxyalkylmethacrylate remaining after the capping reaction is completed can be allowed to remain in the composition as part of the viscosity-adjusting component.

As anyone skilled in this art would understand, the functionality of the isocyanate and the resulting urethane methacrylate does not have to be exactly 2.0, particularly if the average functionality is very close to 2.0. That is, trifunctional or tetrafunctional material can be at least partially if not fully balanced by an an appropriate amount of monofunctional material. In addition, small amounts of trifunctional material which do not significantly raise viscosity can be tolerated; however, it is preferred that such amounts be less than a percent or two by weight.

Bearing in mind that such departures from an idealized methacrylate-capped urethane structure do not necessarily have any adverse effect upon compositions of this invention, the idealized structure of this urethane structure can be represented as follows:

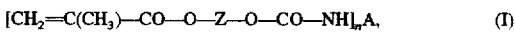

$$[CH_2=C(CH_3)-CO-O-Z-O-CO-NH]_xA, \qquad (I)$$

where

A is the essentially divalent aliphatic or cycloaliphatic group, and

Z is $C_2$-$C_3$-alkylene.

In the aggregate, the functionality of A (as explained above) can vary from 1.75 to 2.25 but is preferably very close to 2.0. That is, A is the residue of the isocyanate compound $A(NCO)_n$, where n can range from 1.75 to 2.25 but is preferably 2.0 or very close to 2.0.

The compound $A(NCO)_n$ can be a $C_2$ to $C_{20}$ (preferably $C_2$ to $C_{12}$) straight or branched-chain aliphatic diisocyanate, preferably a substantially non-yellowing aliphatic diisocyanate such as hexamethylene diisocyanate or any of the available isomers of trimethyl-hexamethylene diisocyanate (e.g. 2,4,4-trimethylhexamethylene diisocyanate or 3,5,5-trimethylhexamethylene diisocyanate) or, less preferably, a cycloaliphatic diisocyanate (which can include both ring-substituted and side chain-substituted NCO groups) such as isophorone diisocyanate. Branched-chain aliphatic diisocyanates having about 4 to about 10 carbon atoms are preferred for this low toxicity and resistance to discoloration.

The capping reaction is well known and need not be described in detail. Any of the known organometallic catalysts can be used, e.g. dibutyl tin dilaurate. Moreover, suitable urethane dimethacrylates are commercially available. It is preferred to avoid carrying out any capping reaction or reactions in situ as part of the formulating procedure for the curable composition; by utilizing a preformed urethane dimethacrylate as an ingredient of the composition, one can be reasonably sure that traces of catalyst, unreacted diisocyanate, or the like will not be present as contaminants. (As is well known in the art, urethane dimethacrylates can be made so as to be essentially free of residual NCO groups, and small amounts of residual OH groups do not normally pose any problem in the practice of this invention.)

Preferred urethane dimethacrylates used in this invention are viscous liquids containing less than 0.5% by weight of contaminants such as acids or water, and other contaminants are, for the most part, present in parts-per-million quantities. Particularly preferred formula weights of these dimethacrylates range from about 400 to about 550 and have viscosities at normal ambient temperature (e.g. 25° C.) ranging from about 8,000 to 15,000 centipoise (cps), e.g. 10,000 to 13,000 cps.

As will be apparent from the foregoing description, it is also preferred to avoid combining the diisocyanate with any chain-extending or cross-linking compounds such as poly (oxyalkylene) diols or triols or monomeric diols or triols or tetrols or polyesters, polyepoxides, and the like. Such chain-extenders and crosslinkers can raise the molecular weight of the resulting urethane compound and hence raise viscosity also.

Because of the low molecular weight (lack of chain-extending or chain-branching material) and the small number of polymerizable sites (essentially two) on the urethane methacrylate component of a curable composition of this invention, this component is best described as a "monomer" rather than a "prepolymer".

REACTIVE DILUENT

It is greatly preferred that curable compositions used in this invention be essentially free of any solvent or diluent (especially any liquid organic solvent) which is inert toward radiation curing of methacrylate groups. In order to provide a downward adjustment of the viscosity of the urethane methacrylate monomer, it is preferred to use a minor amount (e.g 10 to 30% by weight, especially 10 to 20% by weight, based on the total curable composition) of hydroxyalkyl-methacrylate (HEMA and/or HPMA). Both HEMA and HPMA are lower in viscosity as compared to the urethane methacrylate monomer, but they will be cured by ultraviolet or visible light so as to become part of the solid polymer of the molded product. Of the two HPMA isomers, 2-hydroxypropylmethacrylate and 3-hydroxypropylmethacrylate the 2- isomer is preferred because of its greater availability.

The $LD_{50}$ of HEMA is extremely high. In rats, the oral $LD_{50}$ is 5050 mg/kg of body weight, in mice, by the oral route, 3275 mg/kg.

THE PHOTOINITIATOR

The selection of photoinitiator is extremely important in the context of this invention. A reasonably rapid, but well-controlled cure at useful wavelengths is essential. A photoinitiator which is effective only in a very narrow portion of the visible or ultraviolet portion of the spectrum may be completely unsuitable for use in many of the commercially available "light boxes". It is therefore desired that the photoinitiator be effective throughout as much as possible of the range of 200 to 450 nm, particularly in the portion of the ultraviolet spectrum which borders on visible light and the visible portion just beyond this, e.g. >200nm to about 380 or 390 nm. As is known in the art, the "photoinitiator" assists in the initiation reaction, whereby radiation generates free radicals from unsaturated sites on an acrylate or methacrylate molecule.

Preferred photoinitiators are aromatic dialkoxy ketones derived from aromatic diketones and have the formula

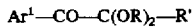

$$Ar^1\text{—CO—C(OR)}_2\text{—R'} \quad (II)$$

where $Ar^1$ is a monocyclic aromatic group such as phenyl,

R is a $C_1$-$C_4$-alkyl group, preferably methyl or ethyl, and

R' is hydrogen or alkyl or a monocyclic aromatic group, preferably a second monocyclic aromatic group.

When $Ar^1$ and R' are both phenyl and R is methyl, the photoinitiator is typically called 2,2-dimethoxy-2-phenyl-acetophenone, which is commercially available and which presently appears to be the optimum choice in terms of speed and spectrum of cure and the properties of the cured article.

PIGMENT

Although curable compositions formulated according to this invention can be useful as clear, unpigmented materials (e.g. for encasing electronic components), the primary thrust of this invention relates to compositions suitable for making hearing aid shells or housings, and these housings are ordinarily colored. In the case of in-ear hearing aids, bright contrasting colors are sometimes used to make it easier to see that a device has been inserted into the ear, but the preferred practice of this invention is to color the housing to match human flesh color (i.e. from deep brown to orange or pink). The selection of suitable pigments for matching flesh tones and for low toxicity and allergenicity is within the skill of the art. Colored in-ear shells are conventionally made translucent or opaque. Basic white pigments such as titanium dioxide are known to be suitable as opacifiers for opaque shells and are extremely low in toxicity, and other inorganic oxides, silicates, etc. can be used to provide the reddish, brownish, yellowish, etc. coloration, provided they are essentially free of cadmium compounds. FDA-approved organic pigments can also be used.

Although massive amounts of pigment might adversely affect the viscosity and curing of the curable composition, only small amounts are needed for the desired flesh-like coloration, and these amounts have no significant adverse effects. Thus, amounts of pigment need not exceed 5% by weight of the curable composition and can be less than 1% by weight. For ease of dispersion or suspension in the curable composition, the pigment can be formulated as a concentrate or masterbatch in HEMA and/or HPMA. The amount of pigment concentrate (including the HEMA and/or HPMA) can also be less than 5% and will typically be in the range of 0.1 to 3% by weight. For most colors, amounts less than 1% by weight are adequate, because the amount of pigment in the concentrate does not normally exceed about 80% by weight (based on the weight of the concentrate), and is typically in the range of 20 to 40% by weight. A batch of concentrate can be prepared by slurrying the pigment in HEMA and/or HPMA and then homogenizing the slurry.

The urethane methacrylate, reactive diluent, and pigment concentrate can be mixed in any desired order to provide a curable composition which has reasonable shelf life a normal ambient temperatures (e.g. 23° C.). Ordinarily, the urethane methacrylate will first be diluted with the hydroxy-alkylmethacrylate and the pigment concentrate will be added to the resulting mixture.

OTHER INGREDIENTS

Although additional photoinitiators, light-absorbers, and other ingredients can be added to compositions of this invention, it is greatly preferred to keep the compositions as simple as possible. A clear, uncolored composition useful in this invention can, for example, contain only the urethane methacrylate monomer the reactive diluent (HEMA and/or HPMA), and optionally (but preferably) an effective amount of any desired inhibitor to provide a reasonable shelf life, and a colored composition can contain only the urethane methacrylate monomer, HEMA and/or HPMA, and pigment concentrate.

It is particularly preferred, as explained above, to avoid the use (in the uncured composition) of inert organic liquid solvents, chain extenders, cross-linkers, polymeric and even oligomeric ingredients, and a-carbon-unsubstituted acrylates and polyacrylates such as hydroxyalkyl acrylates and urethane polyacrylates (as opposed to hydroxyalkyl methacrylates and urethane dimethacrylates). Significant amounts of viscosity-increasing agents such as thixotropes and fillers are preferably avoided also. If any inert organic liquid solvent is used, the amount should be so small as to be fully entrapped (essentially unrecoverable) after the curable composition has been cured.

As a general rule of thumb, one can say that the amount of acrylate (including polyacrylate) should not exceed 1% by weight of the total curable composition and is preferably <0.5%; the amount of mono- or poly-methacrylate, other than the urethane methacrylate and the HEMA and/or HPMA, should not exceed about 2% by weight.

The shelf-life of fully formulated radiation-curable compositions of this invention, where properly stored away from light at 0°–25° C., is several months, e.g. 6 to 12 months.

HOLLOW ARTICLE-FORMING METHOD

In preparing a hollow article in accordance with this invention, the basic method steps include:

A. pouring a pourable liquid radiation-curable composition into the mold cavity of a light-penetrable mold, the mold cavity having an exposed, generally upward-facing surface, until the curable composition covers a major amount of the generally upward-facing surface and until the major amount of said generally upward-facing surface defines a volume of said composition equal to a major amount of the volume of the cavity, B. exposing all but the top surface of the above-defined volume of said composition to electromagnetic radiation having a wavelength in the range of 200 to 450 nm, until a generally solid, 0.25 to 3 mm polymeric layer (>0.1 mm, preferably at least 0.25 mm and up to 3 mm in thickness) has formed within the previously poured composition in closely-spaced relation to the covered portion of the generally upward-facing surface, the uncured remainder of the curable composition being still essentially liquid and pourable, and C. pouring that uncured, liquid remainder of the curable composition from the mold cavity.

For a self-supporting shell with good toughness and impact strength, a plurality of curing steps are used, and as a result, three additional steps are preferred:

D. prior to the next dose of electromagnetic radiation, pouring a translucent organic liquid solvent into the mold cavity, E. exposing the solid, polymeric layer (formed according to step B, above) to a second dose of electromagnetic radiation in the 200 to 450 nm portion of the spectrum, until that layer is converted (through further polymerization, which can include crosslinking) to a self-supporting solid hollow shell of relatively high molecular weight, and F. demolding the resulting self-supporting solid hollow shell.

To remove any traces of the translucent organic liquid which was added during step D, one can rinse the molded hollow product on the inside (and the outside as well, if desired) with an organic liquid, preferably a good solvent for the translucent organic liquid.

A hearing aid shell made according to this invention can house a suitable battery and electronic components such as an audio amplification system.

Shells made according to this invention can be the relatively large type suitable for housing "ITE" (in the ear) hearing aids. This invention is especially well-suited for the manufacture of housings for "CIC" (completely-in-canal) hearing aids, which must satisfy a more difficult set of criteria than the ITE type. Both ITE and CIC shells made according to this invention can be fitted with conventional face plates in the usual manner. Shore D hardness of the finished shells can range, for example, from about 50 to about 90, depending on length of cure.

EXAMPLES

EXAMPLE 1: COMPLETELY-IN-CANAL (CIC) HEARING AID SHELL FORMULATION - OPAQUE -

The difunctinal urethane methacrylate monomer used in this Example was a commercially available, clear, pale yellow liquid mixture of two isomeric forms of HEMA-capped trimethylhexamethylene diisocyanate, i.e. 2-methyl-2-propenic acid 7,7,9-trimethyl-4,13-dioxo-3,14-dioxa-5,12-diazahexadecane-1,16-diyl ester, and 2-methyl-2-propenic acid(2,4,4-trimethyl-1,6-hexane-diyl) bis (iminocarbonyloxy-2,1-ethanediyl) ester. Both isomers have the same formula weight, which is 470. The mixed-isomer monomer has a boiling greater than 150° C., a flash point of 168° C., a refractive index of 1.4830, and a specific gravity of 1.129. The viscosity of the monomer was 11,500±3,500 centipoise (cps). Acid and water contamination was 0.1% each, and no polymer could be detected. Methyl-ether hydroquinone (MEHQ) was present in the amount of 150 parts per million (ppm). The amount of free HEMA was ≤1%, and the amount of free NCO was ≤0.1%.

The HEMA was first charged to a mixer in the amount of 14.91 parts by weight, followed by 0.29 part of 2,2-dimethoxy -2-phenyl-acetophenone photoinitiator (activator). The resulting mixture is stirred for ten minutes, then 84.46 parts of the urethane methacrylate monomer described above is added, and the resulting mixture is stirred and homogenized for 15 minutes. A pigment concentrate in the amount of 0.33 part is then added, the pigment concentrate being a blend of $TiO_2$ opacifier and brown, yellow, and red non-cadmium pigments dispersed in HEMA. After stirring for one hour, the pigmented (fully-formulated) composition was opaque and flesh-colored. The viscosity of the fully-formulated composition was measured at 20° C. with a Brookfield viscometer and found to be 1,300±700 cps.

A customized, clear silicone shell mold (i.e. a shell mold made from an impression of a single individual's ear canal) was filled up with the fully formulated composition of this Example. The fully-formulated composition was generally free of trapped air or gas and conformed well to the mold. An opaque disk was placed over the top of the mold cavity to block light, and the mold was placed in a light box provided with lights radiating a narrow spectrum of radiation centered around 350 nm. With the top lights of the light box turned off, but all others turned on, the shell mold and the fully-formulated composition within it were exposed on all sides and from below to the U.V. light for 2 minutes. At the end of 2 minutes, a thin layer of cured material had formed, notwithstanding the opacity of the fully-formulated composition.

The mold was removed from the light box, and the uncured portion of the composition was poured into a separate, light-fast container, where it remained suitable for re-use for several hours.

The mold cavity (where the uncured material had been) was then filled with glycerine, and the thus-filled mold was placed back in the light box, (without the light-blocking disk) for completion of the cure. All lights were turned on in the light box, and the mold and partially cured layer were exposed to radiation on all sides, top and bottom for another 2 minutes. After the total cure was complete, the mold was removed, the glycerine poured out, and the shell-like cured product was rinsed with isopropyl alcohol to remove any tackiness. The shell was found to be tough, hard, rigid but not brittle, and resistant to fracturing and other ill effects from rough handling.

EXAMPLE 2: CIC SHELLS - TRANSLUCENT AND CLEAR

The procedure of Example 1 was repeated, except that the fully formulated composition contained no $TiO_2$ and either a red or blue pigment or no pigment at all. It was found that the exposure time in the light box could be substantially reduced, as set forth below.

TABLE 1

Cure Times vs. Light Transmission of Fully Formulated Curable Composition

| Formulation | First Cure (Sides and Bottom) | Second Cure (Sides, Top, Bottom) |
|---|---|---|
| Clear | 20 Seconds | 20 seconds |
| Translucent | 30 Seconds | 30 Seconds |

It was found that the first and second cures can be varied, so long as total cure time adds up to at least 40 seconds ( for the clear composition) or at least 60 seconds (for the translucent composition). The material ("investment material") from which the clear mold is made and the light box configuration can affect cure time.

EXAMPLE 3

Durometer Hardness Measurements

Since the in-ear hearing aid housing shells made in Example 1 and 2 were too thin to test with a durometer, 2 ml samples of fully-formulated composition were cast and cured(in a single curing step) to form solid disks at least 2 mm in thickness, and these disks were tested for Shore D hardness.

The hardness was found to vary with cure time and with the pigment content; see Table II.

TABLE II

| Pigment Formulation (color) | Cure Time (seconds) | Shore D Hardness of Cured Disk | Curable Composition viscosity (cps) |
|---|---|---|---|
| opaque pink | 120 | 56 | 850 |
| opaque brown | 180 | 54 | 890 |
| opaque tan | 120 | 56 | 880 |
| transparent blue | 30 | 55 | 840 |
| transparent red | 30 | 61 | 830 |

What is claimed is:

1. A method for making a solid hollow shell comprising radiation-cured solid polymer, comprising the steps of:

A. pouring a pourable liquid radiation-curable composition into the mold cavity of a mold which permits the penetration of electromagnetic radiation having a wavelength in the range of 200 to 450 nm, said mold cavity having an interior surface defining a mold cavity volume, said pouring being continued until a major amount of the mold cavity volume is filled with said liquid radiation-curable composition, B. exposing all but the top surface of the liquid radiation-curable composition in the mold cavity to electromagnetic radiation having a wavelength in the range of 200 to 450 nm, until a generally solid, polymeric layer has formed, within still-liquid radiation-curable composition in the mold cavity and in closely-spaced relation to said interior surface of the mold cavity, said still-liquid radiation-curable composition in the mold cavity being still pourable and consisting essentially of pourable liquid, said layer ranging from >0.1 to 3 mm in thickness, and C. pouring said still-liquid radiation-curable composition from said mold cavity, said pourable liquid radiation-curable composition comprising:

a major amount of a hydroxyalkylmethacrylate-capped, essentially difunctional urethane methacrylate monomer having a molecular weight in the range of about 360 to about 950 and viscosity less than about 15,000 centipoise at 25° C. and having the structural formula I

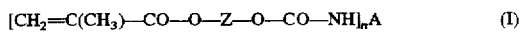
    $$[CH_2=C(CH_3)—CO—O—Z—O—CO—NH]_nA \qquad (I)$$

where

A is an essentially divalent aliphatic or cycloaliphatic group,

Z is $C_2$-$C_3$-alkylene, and n is a number ranging from 1.75 to 2.25;

a viscosity-adjusting minor amount of unreacted hydroxy ($C_2$-$C_3$-alkyl) methacrylate monomer, and a photoinitiating amount, not exceeding about 5% by weight, of a photoinitiator of the formula II

    $$Ar^1—CO—C(OR)_2—R, \qquad (II)$$

where $Ar^1$ is a monocyclic aromatic group,

R is a $C_1$-$C_4$-alkyl group, and

R' is hydrogen or alkyl or a monocyclic aromatic group;

said radiation-curable composition being essentially free of: a recoverable amount of liquid organic solvent which is inert toward radiation curing; a viscosity-increasing amount of a viscosity-increasing solid, other than a colorant; and compounds having at least one α-carbon-unsubstituted acrylate group; and a polymeric shell-forming amount of said unreacted hydroxy ($C_2$-$C_3$-alkyl) methacrylate monomer being cured by said electromagnetic radiation and becoming part of the solid, polymeric layer during said step B.

2. A method according to claim 1, comprising the following further steps:

D. pouring a translucent organic liquid solvent into said mold cavity,

E. exposing the said solid, polymeric layer to electromagnetic radiation having a wavelength in the range of 200 to 450 nm, until said solid, polymeric layer is converted to a self-supporting solid hollow shell of greater molecular weight than said solid, polymeric layer, and F. demolding said self-supporting solid hollow shell.

3. A method according to claim 2, wherein the interior of said self-supporting solid hollow shell, after removal of said translucent organic liquid solvent therefrom, is rinsed with an organic liquid.

4. A method according to claim 2, wherein said step B is carried out until the thickness of said layer is in the range of about 0.3 to about 1.5 mm.

5. A method according to claim 2, wherein said pourable liquid radiation-curable composition contains from about 0.1 to about 3% by weight of a pigment.

6. A method according to claim 2, wherein A of said formula I is a $C_4$-$C_{20}$-straight- or branched-chain aliphatic group, and where n is about 2.0.

7. A method according to claim 2, wherein said pourable liquid radiation-curable composition contains a color-imparting amount of a pigment, said amount not exceeding about 5% by weight.

8. A method according to claim 7, wherein said pourable liquid radiation-curable composition contains 0.1 to about 3% by weight of a flesh color-imparting pigment concentrate comprising a pigment dispersed in a hydroxyalkyl methacrylate.

9. A method according to claim 2, wherein, in said formula II, R is methyl or ethyl, and R' is a monocyclic aryl group.

10. A method according to claim 2, wherein, in said formula II, R is methyl, and $Ar^1$ and R' are both unsubstituted phenyl.

11. A method according to claim 2, wherein said pourable liquid radiation-curable composition has a Brookfield viscosity at 20° C. in the range of about 600 to about 2000 centipoise.

12. A method according to claim 2, wherein said viscosity-adjusting minor amount of unreacted hydroxy($C_2$-$C_3$-alkyl)methacrylate monomer ranges from about 10 to about 20% by weight of said pourable liquid radiation-curable composition.

13. A method according to claim 2, wherein said major amount of said urethane methacrylate monomer ranges from about 80 to about 90% by weight of said pourable liquid radiation-curable composition.

* * * * *